US012797904B2

(12) United States Patent
Jiang

(10) Patent No.: US 12,797,904 B2
(45) Date of Patent: Nov. 17, 2026

(54) ULTRASONIC TRANSDUCER AND ULTRASONIC PROBE USING THE SAME

(71) Applicant: Qisda Corporation, Taoyuan City (TW)

(72) Inventor: Fu-Sheng Jiang, Taoyuan City (TW)

(73) Assignee: QISDA CORPORATION, Taoyuan City (TW)

( * ) Notice: Subject to any disclaimer, the term of this patent is extended or adjusted under 35 U.S.C. 154(b) by 197 days.

(21) Appl. No.: 18/908,985

(22) Filed: Oct. 8, 2024

(65) Prior Publication Data

US 2025/0128289 A1 Apr. 24, 2025

(30) Foreign Application Priority Data

Oct. 24, 2023 (TW) ................................ 112140572

(51) Int. Cl.
*B06B 1/02* (2006.01)

(52) U.S. Cl.
CPC .......... *B06B 1/0292* (2013.01); *B06B 1/0215* (2013.01)

(58) Field of Classification Search
CPC ............................ B06B 1/0292; B06B 1/0215
See application file for complete search history.

(56) References Cited

U.S. PATENT DOCUMENTS

2005/0228285 A1* 10/2005 Huang .................. B06B 1/0292 600/459
2006/0004289 A1* 1/2006 Tian ...................... B06B 1/0292 600/459
2016/0199030 A1* 7/2016 Patil ..................... A61B 8/4411 600/459
2022/0415296 A1* 12/2022 Alie ..................... A61B 8/4444

FOREIGN PATENT DOCUMENTS

CN 1863485 A 11/2006
CN 103155597 A 6/2013
CN 109092650 B 5/2020

OTHER PUBLICATIONS

Yih-Ping Wang, et al., The Fabrication of Capacitive Micromachined Ultrasonic Transducer; Journal of China College of Marine Technology and Commerce, Mar. 2006; pp. 1-16; Taipei, Taiwan.
Office action of counterpart application by Taiwan IP Office on May 14, 2024.

* cited by examiner

*Primary Examiner* — Tulsidas C Patel
*Assistant Examiner* — Mohammed Ahmed Qureshi

(57) ABSTRACT

An ultrasonic transducer device including a substrate and an ultrasonic oscillation unit is provided. The ultrasonic oscillation unit is disposed on the substrate. The ultrasonic oscillation unit includes a first electrode layer, a first insulating layer, a second electrode layer, a second insulating layer, a plurality of capacitor protrusions, and a cavity located between the first insulating layer and the second insulating layer. The capacitor protrusions are disposed in the cavity by being disposed on at least one of the first insulating layer and the second insulating layer. The first insulating layer and the second insulating layer are separated by a gap and are located between the first electrode layer and the second electrode layer. The height of each of the capacitor protrusions is less than a height of the gap.

17 Claims, 6 Drawing Sheets

ULTRASONIC TRANSDUCER AND ULTRASONIC PROBE USING THE SAME

This application claims the benefit of Taiwan application Serial No. 112140572, filed Oct. 24, 2023, the subject matter of which is incorporated herein by reference.

BACKGROUND OF THE INVENTION

Field of the Invention

The invention relates in general to an ultrasonic transducer device and an ultrasonic probe using the same.

Description of the Related Art

Along with the advance in medical technology, ultrasonic probing technology is getting more matured. Generally speaking, in the ultrasonic probing method, an ultrasonic signal is emitted to the underneath of the skin by a probe capable of emitting an ultrasonic signal. Then, the probe can determine the shape and position of an object that is under the skin and invisible to naked eyes for various medical purposes according to the reflected ultrasonic signal.

To improve the quality of ultrasonic signals and images, the sensitivity and efficiency of the elements of the ultrasonic transducer device must be increased, so that ultrasonic signals can be effectively emitted and received.

SUMMARY OF THE INVENTION

The invention is directed to an ultrasonic transducer device and an ultrasonic probe using the same capable of increasing the sensitivity and efficiency of an ultrasonic oscillation unit by increasing the capacitance of the oscillation element. The ultrasonic oscillation element is also referred as ultrasonic oscillator.

According to one embodiment of the present invention, an ultrasonic transducer device including a substrate and an ultrasonic oscillation unit is provided. The ultrasonic oscillation unit is disposed on the substrate. The ultrasonic oscillation unit includes a first electrode layer, a first insulating layer, a second electrode layer, a second insulating layer, a plurality of capacitor protrusions, and a cavity located between the first insulating layer and the second insulating layer. The capacitor protrusions are disposed in the cavity by being disposed on at least one of the first insulating layer and the second insulating layer. The first insulating layer and the second insulating layer are separated by a gap and are located between the first electrode layer and the second electrode layer. The height of each of the capacitor protrusions is less than the height of the gap.

According to another embodiment of the present invention, an ultrasonic probe is provided. The ultrasonic probe includes a hand-held casing, an acoustic lens, and an ultrasonic transducer device. The hand-held casing has a first end and a second end. The acoustic lens is disposed on the first end or the second end. The ultrasonic transducer device is disposed in the hand-held casing and is located on one side of the hand-held casing adjacent to the acoustic lens. The ultrasonic transducer device includes a substrate and an ultrasonic oscillation unit. The ultrasonic oscillation unit is disposed on the substrate, and includes a first electrode layer, a first insulating layer, a second electrode layer, a second insulating layer, a plurality of capacitor protrusions, and a cavity located between the first insulating layer and the second insulating layer. The capacitor protrusions are disposed in the cavity by being disposed on at least one of the first insulating layer and the second insulating layer. The first insulating layer and the second insulating layer are separated by a gap and are located between the first electrode layer and the second electrode layer. The height of each of the capacitor protrusions is less than a height of the gap.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
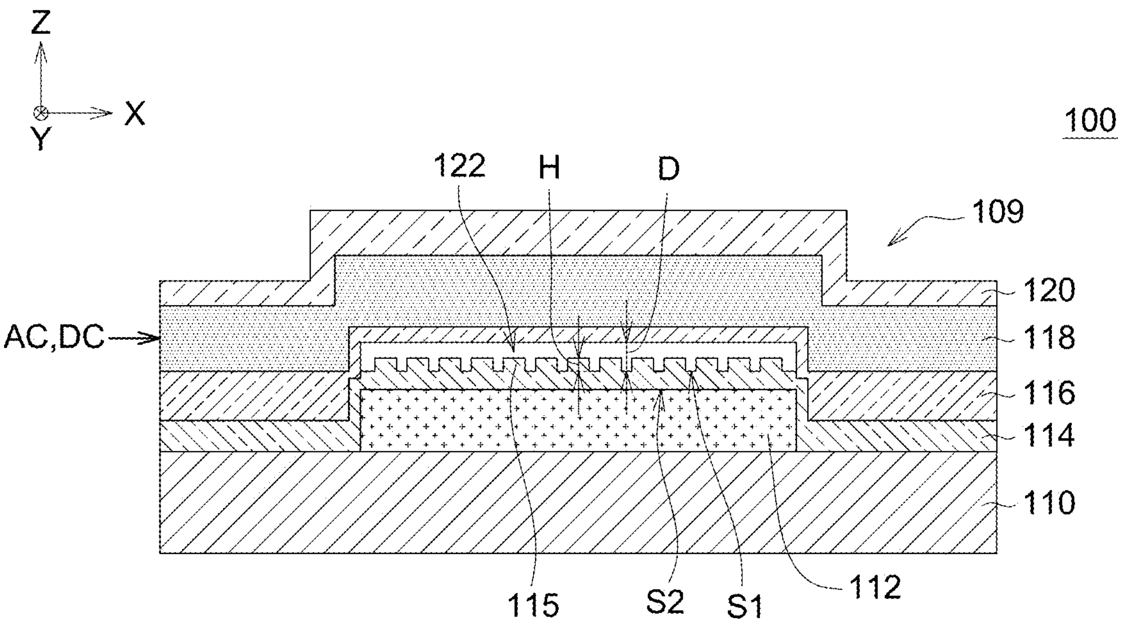
FIG. 1 is a cross-sectional view of an ultrasonic transducer device according to an embodiment of the invention.

Referring to FIG. 1, a cross-sectional view of an ultrasonic transducer device 100 according to an embodiment of the invention is shown. The ultrasonic transducer device 100 of the present embodiment can be a transducer formed of a plurality of capacitive micro-machined ultrasonic transducers (CMUT). The ultrasonic transducer device 100 includes a substrate 110 and an ultrasonic oscillation unit 109. The ultrasonic oscillation unit 109 is disposed on the substrate 110. The ultrasonic oscillation unit 109 includes a first electrode layer 112, a first insulating layer 114, a second electrode layer 118, a second insulating layer 116, a plurality of capacitor protrusions 115, and a cavity 122 located between the first insulating layer 114 and the second insulating layer 116.

Although only one ultrasonic oscillation unit 109 is illustrated in FIG. 1, it can be understood that the ultrasonic oscillation unit 109 can be arranged as a one-dimensional array or a two-dimensional array. For instance, a plurality of ultrasonic oscillation units 109 can be arranged along a first direction X and electrically connected to each other to form a one-dimensional array of ultrasonic oscillation units; or, a plurality of ultrasonic oscillation units 109 can be arranged along the first direction X and a second direction Y perpendicular to the first direction and electrically connected to each other to form a two-dimensional array of ultrasonic oscillation units. Generally speaking, a plurality of ultrasonic oscillation pieces can be arranged along a long-axial direction to form a set of ultrasonic oscillation pieces in a strip shape. Each ultrasonic oscillation piece can individually receive an alternate current voltage AC and/or a direct current DC and vibrate. Moreover, each ultrasonic oscillation piece can also individually receive a sound pressure signal (such as an ultrasonic signal) and vibrate.

Refer to FIG. 1. The substrate 110 can be a semiconductor wafer or a glass substrate, and a first electrode layer 112, a first insulating layer 114, a second electrode layer 118, a second insulating layer 116 and a plurality of capacitor protrusions 115 can be formed on the substrate 110 using a micro-electromechanical process or a semiconductor process. The semi-conductor process includes a film deposition process, a lithography process, an etching process, and a cleaning process. The film deposition process includes depositing a plurality of film layers on the substrate 110. The lithography process includes defining the pattern and shape of each film layer through the photo-resist layer, so that each film layer stacks at a pre-determined position. The etching process includes removing redundant film layer to form a cavity 122 or a groove in the film layer. The cleaning process includes removing the photo-resist layer with an etching solution and other solution.

In an embodiment, the first electrode layer 112, the first insulating layer 114, the second insulating layer 116 and the second electrode layer 118 are sequentially stacked in a bottom-up manner. The first electrode layer 112 is formed on the substrate 110. The first insulating layer 114 covers the first electrode layer 112. The second insulating layer 116 covers the first insulating layer 114. A cavity 122 is interposed between the first insulating layer 114 and the second insulating layer 116, so that the first insulating layer 114 and the second insulating layer 116 are separated by a gap D. Firstly, a sacrificial layer is formed between the first insulating layer 114 and the second insulating layer 116. After structure stacking is completed, the sacrificial layer is etched with an etching solution to form a cavity 122 between the first insulating layer 114 and the second insulating layer 116. Then, the second electrode layer 118 is formed on the second insulating layer 116. In an embodiment, an upper insulating layer 120 can be formed on the second electrode layer 118 to protect the second electrode layer 118. The upper insulating layer 120, the first insulating layer 114, and the second insulating layer 116 can be formed of identical or different materials. The said insulating layer can be formed of a silicon oxide (such as $SiO_2$), a nitride (such as SiN), a nitrogen oxide or any other suitable dielectric insulating materials.

Referring to FIG. 1, to increase the sensitivity and efficiency of the ultrasonic oscillation unit 109, a plurality of capacitor protrusions 115 are formed in the cavity 122, and the height H of the capacitor protrusions 115 is less than the gap D between the first insulating layer 114 and the second insulating layer 116. The capacitor protrusions 115 can be formed on the first insulating layer 114 with a part of the film layer being removed using a lithography process and an etching process, wherein the cross-section is not necessarily in the shape of a square, and the shape of a triangle, a circle, or other suitable shape would also do. The capacitor protrusions 115 can be arranged as a one-dimensional or two-dimensional array, and the distance between two adjacent capacitor protrusions 115 is greater than or equivalent to a pre-determined value. For instance, if the exposure resolution is 1.5 μm, then the distance between two adjacent capacitor protrusions 115 is equivalent to or greater than 1.5 μm. Although FIG. 1 illustrates only one-dimensional capacitor protrusions 115, it can be understood that a plurality of capacitor protrusions 115 can be arranged as a two-dimensional array of capacitor protrusions 115 along a first direction X and a second direction Y perpendicular to the first direction X. Besides, the capacitor protrusions 115 can be formed of a silicon oxide (such as $SiO_2$), a nitride (such as SiN), a nitrogen oxide or any other suitable dielectric insulating materials. The capacitor protrusions 115 and the first insulating layer 114 can be integrally formed in one piece.

In an embodiment, the height H of the capacitor protrusions 115 is less than ½ or ⅓ of the gap D. For instance, the gap D between the first insulating layer 114 and the second insulating layer 116 can be 0.2 μm; the height H of the capacitor protrusions 115 is approximately equivalent to ⅓ of the gap D; the width of the first insulating layer 114 and the second insulating layer 116 is approximately equivalent to 40 μm; the capacitor area between the first insulating layer 114 and the second insulating layer 116 increases in response to the capacitor protrusions 115. For instance, when the sum of the lengths of the lateral sides of the capacitor protrusions 115 is 1.716 μm, the capacitor area between the first insulating layer 114 and the second insulating layer 116 will change from 40 μm*40 μm to 41.716 μm*41.716 μm, that is, the capacitor area approximately increases by 8.8%. Besides, as the gap D decreases by ⅓, about a half of the capacitance of the first electrode layer 112 will increase along with the decrease in the gap D. For instance, the capacitance increases by 16.6%. Thus, in response to the capacitor protrusions 115, the capacitance of singular ultrasonic oscillation unit 109 increases by about 25%, so that the sensitivity and efficiency of the ultrasonic oscillation unit 109 can be increased.

Referring to FIG. 1, the first electrode layer 112 can be a grounding layer; the second electrode layer 118 can be a signal layer for receiving an alternate current voltage AC and/or a direct current voltage DC signal. For instance, the second electrode layer 118, relative to the first electrode layer 112, is driven by a direct current voltage DC to be recessed towards the first electrode layer 112, making the first insulating layer 114 and the second insulating layer 116 closer to each other. Or, the second electrode layer 118, relative to the first electrode layer 112, is driven by an alternate current voltage AC or an external sound pressure to generate vibrations, so as to generate an ultrasonic signal. The pulse period of the alternate current voltage AC can decide the vibration frequency of the outputted ultrasonic signal, so that the ultrasonic signal can have different frequencies.

Figure 2:
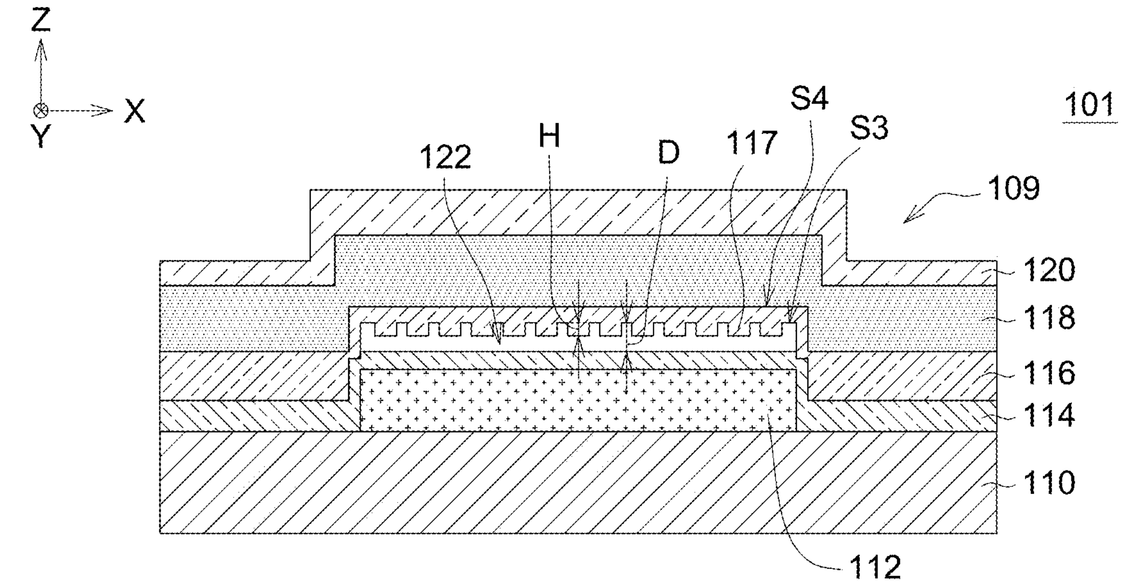
FIG. 2 is a cross-sectional view of an ultrasonic transducer device according to another embodiment of the invention.

Referring to FIG. 2, a cross-sectional view of an ultrasonic transducer device 101 according to another embodiment of the invention is shown. The ultrasonic transducer device 101 includes a substrate 110 and an ultrasonic oscillation unit 109. The ultrasonic oscillation unit 109 is disposed on the substrate 110, and includes a first electrode layer 112, a first insulating layer 114, a second electrode layer 118, a second insulating layer 116, a plurality of capacitor protrusions 117, and a cavity 122 located between the first insulating layer 114 and the second insulating layer 116. Designations common to the accompanying drawings are used to indicate identical or similar elements, and the descriptions are not repeated here. The present embodiment is different from the above embodiment as follows: In FIG. 1, the capacitor protrusions 115 is located on a first surface (upper surface S1) of the first insulating layer 114, a second surface (lower surface S2) of the first insulating layer 114 is connected to the first electrode layer 112, and the first surface and the second surface are located on two opposite sides of the first insulating layer 114. In FIG. 2, the capacitor protrusions 117 is located on a first surface (lower surface S3) of the second insulating layer 116, a second surface (upper surface S4) of the second insulating layer 116 is connected to the second electrode layer 118, and the first surface and the second surface are located on two opposite sides of the second insulating layer 116. That is, the capacitor protrusions 117 can be located above the interior of the cavity 122, so that the capacitance of singular ultrasonic oscillation unit 109 increases in response to the capacitor protrusions 117, and the sensitivity and efficiency of the ultrasonic oscillation unit 109 can be increased. The capacitor protrusions 117 and the second insulating layer 116 can be integrally formed in one piece.

Figure 3:
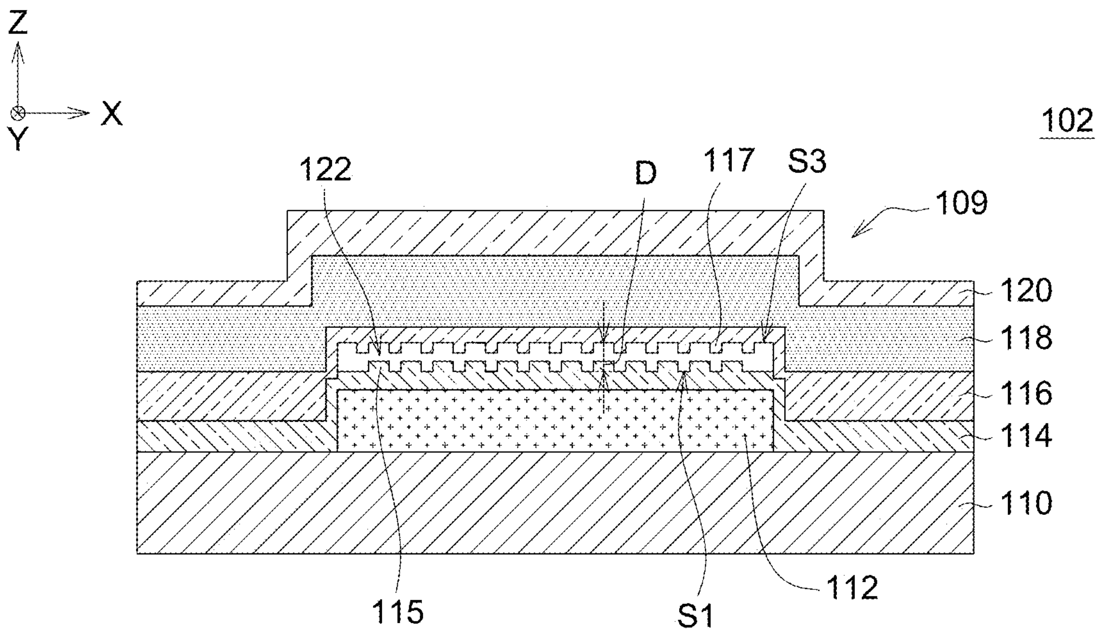
FIG. 3 is a cross-sectional view of an ultrasonic transducer device according to another embodiment of the invention.

Referring to FIG. 3, a cross-sectional view of an ultrasonic transducer device 102 according to another embodiment of the invention is shown. Designations common to the accompanying drawings are used to indicate identical or similar elements, and the descriptions are not repeated here. The design of the ultrasonic transducer device 102 of the present embodiment can be combined with that of the two embodiments disclosed above, wherein the capacitor protrusions include a plurality of first capacitor protrusions 115 and a plurality of second capacitor protrusions 117; the first capacitor protrusions 115 are located on a surface (upper surface S1) of the first insulating layer 114, the second capacitor protrusions 115 located on another surface (lower surface S3) of the second insulating layer 116, and the first capacitor protrusions 115 and the second capacitor protrusions 115 are arranged in a staggered manner. That is, the first capacitor protrusions 115 and the second capacitor protrusions 117 can correspondingly be disposed above and below the interior of the cavity 122, so that singular ultrasonic oscillation unit 109 can increase 50% of capacitance in response to the first and second capacitor protrusions 115 and 117 (that is, the capacitance of the first electrode layer 112 increases by 25%, and the capacitance of the second electrode layer 118 increases by 25%), and the sensitivity and efficiency of the ultrasonic oscillation unit 109 can be increased.

Figure 4:
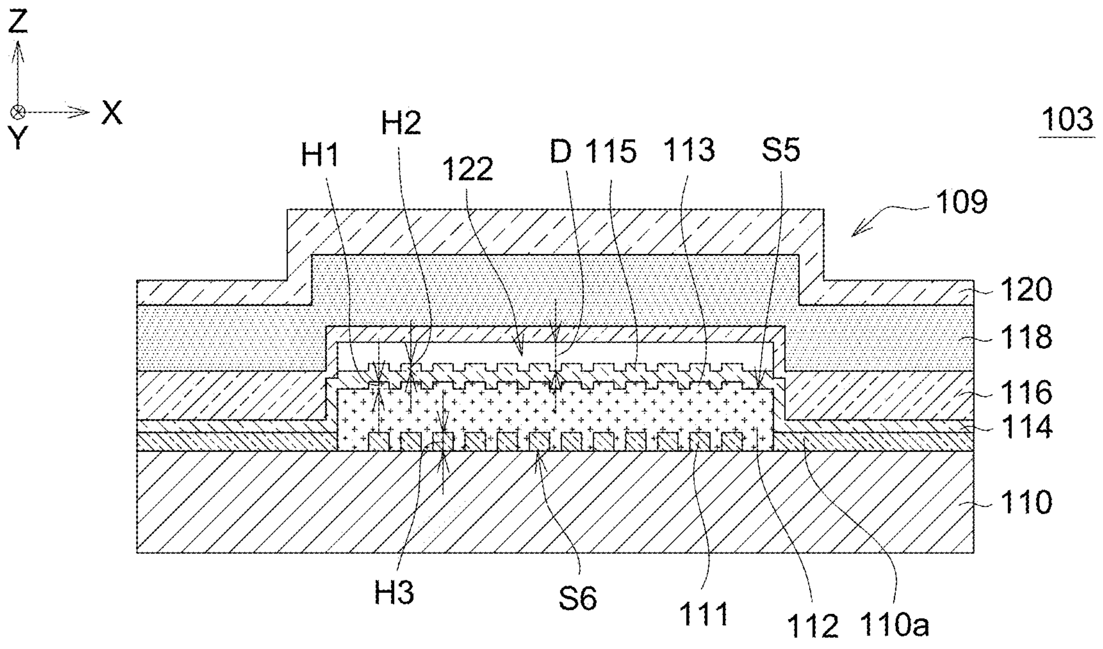
FIG. 4 is a cross-sectional view of an ultrasonic transducer device according to another embodiment of the invention.

Referring to FIG. 4, a cross-sectional view of an ultrasonic transducer device 103 according to another embodiment of the invention is shown. The ultrasonic transducer device 103 of the present embodiment includes the first electrode layer 112, the first insulating layer 114, the second electrode layer 118, the second insulating layer 116, a plurality of capacitor protrusions 115, and the cavity 122 disclosed above, wherein the first electrode layer 112 further includes a plurality of electrode protrusions 113 disposed corresponding to the capacitor protrusions 115 and protruded from or recessed towards a surface (upper surface S5) of the first electrode layer 112. The electrode protrusions 113 and the first electrode layer 112 can be integrally formed in one piece.

In an embodiment, the electrode protrusions 113 can be formed on the first electrode layer 112 with a part of the film layer being removed using a lithography process and an etching process, wherein the cross-section is not necessarily in the shape of a square, and the shape of a triangle, a circle, or other suitable shape would also do. The electrode protrusions 113 are arranged as a one-dimensional or two-dimensional array, and the distance between two adjacent electrode protrusions 113 is greater than or equivalent to a pre-determined value. For instance, if the exposure resolution is 1.5 μm, then the distance between two adjacent electrode protrusions 113 is equivalent to or greater than 1.5 μm. Although FIG. 4 illustrates only one-dimensional electrode protrusions 113, it can be understood that a plurality of electrode protrusions 113 can be arranged as a two-dimensional array of electrode protrusions 113 along a first direction X and a second direction Y perpendicular to the first direction X.

In an embodiment, the height H of the electrode protrusions 113 is less than ½ or ⅓ of the gap D. Besides, the first insulating layer 114 covers the first electrode layer 112 having the electrode protrusions 113, so that the first insulating layer 114 forms a plurality of capacitor protrusions 115. For instance, the gap D between the first insulating layer 114 and the second insulating layer 116 can be 0.2 μm, the height H2 of the capacitor protrusions 115 and the height H1 of the electrode protrusions 113 are approximately equivalent to ½ or ⅓ of the gap D, and in response to the capacitor protrusions 115, the capacitor area between the first insulating layer 114 and the second insulating layer 116 increases, so that the sensitivity and efficiency of the ultrasonic oscillation unit 109 can be increased.

Referring to FIG. 4, the ultrasonic transducer device 103 of the present embodiment further includes a third insulating layer **110*a* disposed between the substrate 110 and the first electrode layer 112, wherein the third insulating layer 110*a* includes a plurality of insulating protrusions 111 disposed corresponding to the electrode protrusions 113 and protruded from a surface (upper surface S6) of the substrate 110**.

In an embodiment, the insulating protrusions 111 can be formed on the substrate 110 with a part of the film layer being removed using a lithography process and an etching process, wherein the cross-section is not necessarily in the shape of a square, and the shape of a triangle, a circle, or other suitable shape would also do. The insulating protrusions 111 can be arranged as a one-dimensional or two-dimensional array, and the distance between two adjacent insulating protrusions 111 is greater than or equivalent to a pre-determined value. For instance, if the exposure resolution is 1.5 μm, then the distance between two adjacent insulating protrusions 111 is equivalent to or greater than 1.5 μm. Although FIG. 4 illustrates only one-dimensional insulating protrusions 111, it can be understood that a plurality of insulating protrusions 111 can be arranged as a two-dimensional array of insulating protrusions 111 along a first direction X and a second direction Y perpendicular to the first direction X.

In an embodiment, the height H3 of the insulating protrusions 111 is less than ½ or ⅓ of the gap D. Besides, the first electrode layer 112 covers the third insulating layer **110*a* having the insulating protrusions 111, so that the first electrode layer 112 forms a plurality of electrode protrusions 113. Additionally, the first insulating layer 114 covers the first electrode layer 112 having the electrode protrusions 113, so that the first insulating layer 114 forms a plurality of capacitor protrusions 115. For instance, the gap D between the first insulating layer 114 and the second insulating layer 116 can be 0.2 μm, the height H2 of the capacitor protrusions 115, the Height H1 of the electrode protrusions 113, and the height H3 of the insulating protrusions 111 are approximately equivalent to ½ or ⅓ of the gap D, and the capacitor area between the first insulating layer 114 and the second insulating layer 116 increases in response to the capacitor protrusions 115, so that the sensitivity and efficiency of the ultrasonic oscillation unit 109** can be increased.

Figure 5:
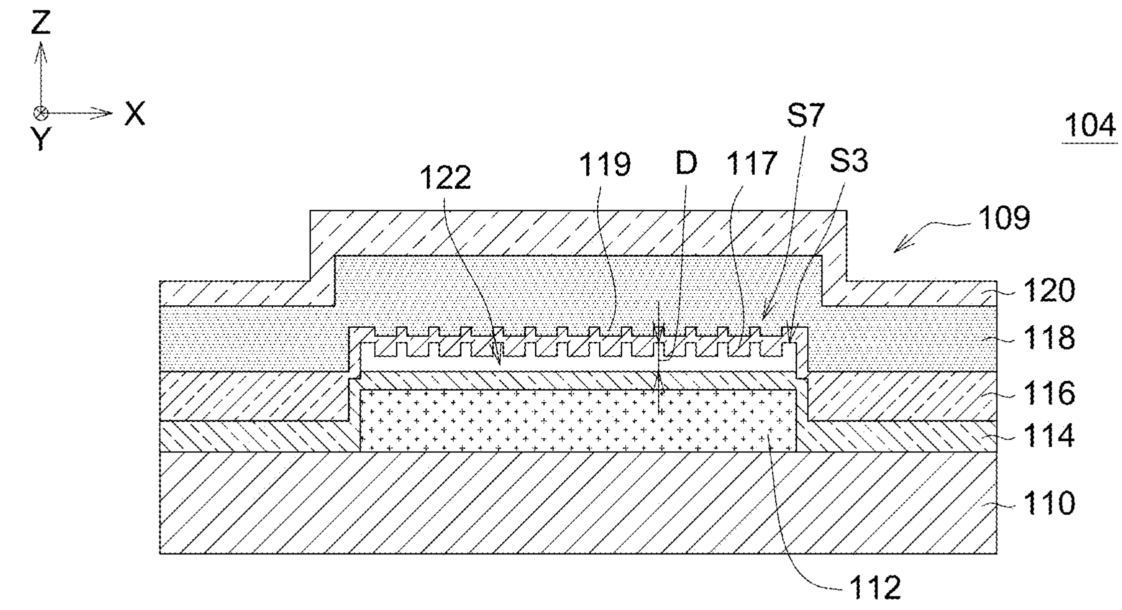
FIG. 5 is a cross-sectional view of an ultrasonic transducer device according to another embodiment of the invention.

Referring to FIG. 5, a cross-sectional view of an ultrasonic transducer device 104 according to another embodiment of the invention is shown. The present embodiment is different from the above embodiment as follows. In FIG. 4, the electrode protrusions 113 are disposed corresponding to the capacitor protrusions 115 and protruded from or recessed towards a surface (upper surface S5) of the first electrode layer 112. In FIG. 5, the electrode protrusions 119 are disposed corresponding to the capacitor protrusions 117 and protruded from or recessed towards a surface (lower surface S7) of the second electrode layer 118. That is, the capacitor protrusions 117 and the electrode protrusions 119 can be located above the interior of the cavity 122, so that the capacitance of singular ultrasonic oscillation unit 109 increases in response to the capacitor protrusions 117, and the sensitivity and efficiency of the ultrasonic oscillation unit 109 can be increased. The electrode protrusions 119 and the second electrode layer 118 can be integrally formed in one piece.

In an embodiment, the design of the ultrasonic transducer device 104 can be combined with the embodiment of FIG. 4, wherein the capacitor protrusions include a plurality of first capacitor protrusions 115 and a plurality of second capacitor protrusions 117; the first capacitor protrusions 115 are located on a surface (upper surface S1) of the first insulating layer 114, the second capacitor protrusions 115 are located on another surface (lower surface S3) of the second insulating layer 116, and the first capacitor protrusions 115 and the second capacitor protrusions 115 are arranged in a staggered manner. Additionally, the first electrode layer 112 further includes a plurality of first electrode protrusions 113 disposed corresponding to the first capacitor protrusions 115. The second electrode layer 118 further includes a plurality of second electrode protrusions 119 disposed corresponding to the electrode protrusions 119. That is, at least one of the first electrode layer 112 and the second electrode layer 118 includes a plurality of electrode protrusions protruded from or recessed towards a surface of the first electrode layer 112 and/or the second electrode layer 118. Through the above disposition, singular ultrasonic oscillation unit 109 can increase 50% of capacitance in response to the first and second capacitor protrusions 115 and 117 (that is, the capacitance of the first electrode layer 112 increases by 25%, and the capacitance of the second electrode layer 118 increases by 25%), so that the sensitivity and efficiency of the ultrasonic oscillation unit 109 can be increased.

Figure 6:
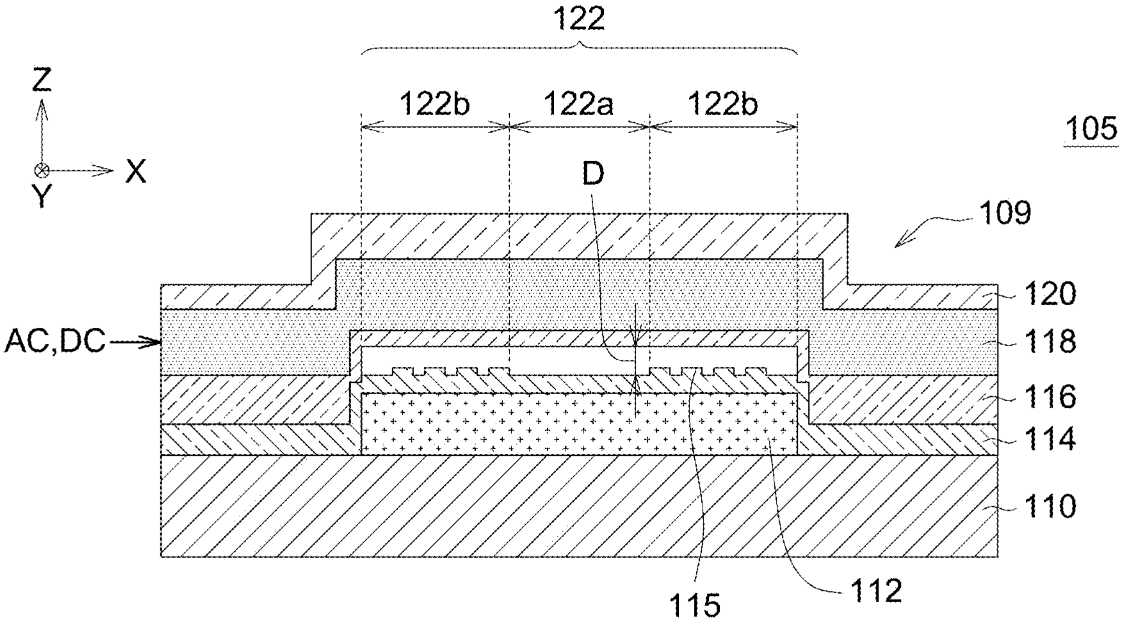
FIG. 6 is a cross-sectional view of an ultrasonic transducer device according to another embodiment of the invention.
Figure 7:
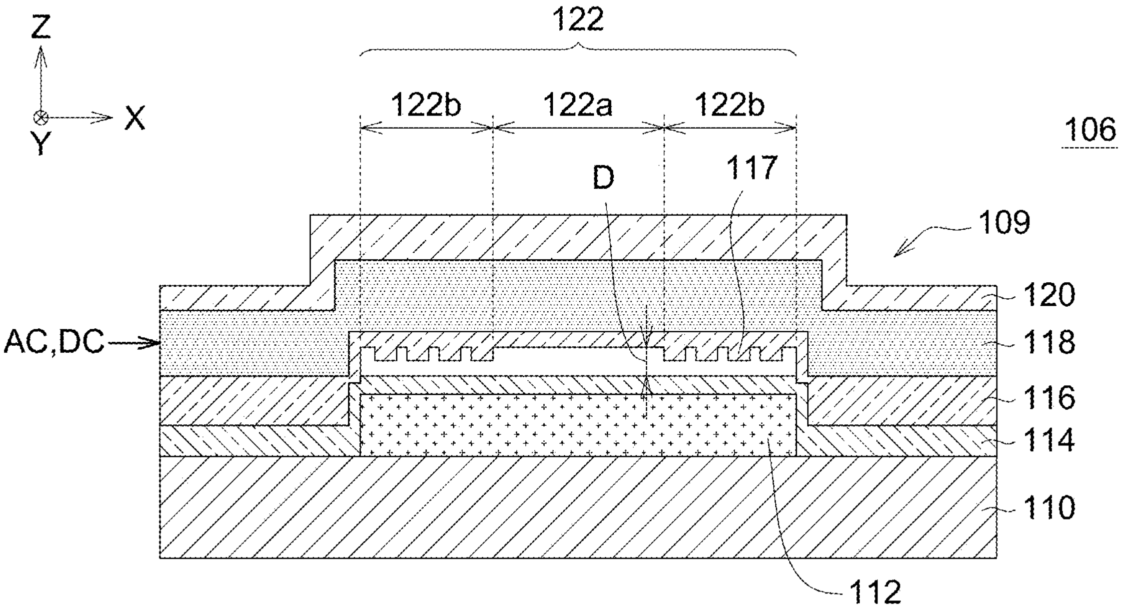
FIG. 7 is a cross-sectional view of an ultrasonic transducer device according to another embodiment of the invention.

Referring to FIGS. 6 and 7, cross sectional views of ultrasonic transducer devices 105 and 106 according to another embodiment of the invention are respectively shown. The present embodiment is different from the embodiments of FIG. 1 and FIG. 2 in that the cavity 122 has a first region **122*a* and a second region 122*b*; the first region 122*a* is located at the central part of the ultrasonic oscillation unit 109; the second region 122*b* surrounds the first region 122*a* and is located on the peripheral of the ultrasonic oscillation unit 109. The capacitor protrusions 115 are disposed in the second region 122*b* by being disposed on at least one of the first insulating layer 114 and the second insulating layer 116. Details of the disposition of the first electrode layer 112, the second electrode layer 118, the first insulating layer 114, the second insulating layer 116, and a plurality of capacitor protrusions 115 and 117 can be obtained with reference to FIG. 1 and FIG. 2 and are not repeated here. The disposition of the capacitor protrusions 115 and 117 of the present embodiment can be used in the embodiment of FIG. 3**, and the details are not repeated here.

For instance, the first region **122*a* can be formed by a space whose transverse cross-section is circular or polygonal. The first region 122*a* has a transverse cross-sectional area greater than a pre-determined value. The pre-determined value is determined according to the gap D of the cavity 122 and the degree of recess towards the first region 122*a* when the second electrode layer 118 is driven by a direct current voltage DC. For instance, the transverse cross-sectional area of the first region 122*a* can be greater than or equivalent to 10% of the transverse cross-sectional area of the cavity 122. When the gap D of the cavity 122 changes, the transverse cross-sectional area of the first region 122*a*** can be correspondingly enlarged or reduced.

Besides, when the second electrode layer 118 is driven by a direct current voltage DC to be recessed towards the first region **122*a*, the second insulating layer 116 can also be recessed towards the first region 122*a* to correspondingly contact the first insulating layer 114. In the recess mode, when the second electrode layer 118, relative to the first electrode layer 112, is driven by an alternate current voltage AC or an external sound pressure, the second electrode layer 118 and the second insulating layer 116 can generate vibrations in the second region 122*b* but vibrations are not necessarily generated in the first region 122*a*. That is, when the vibration mode of the ultrasonic oscillation unit 109 changes from the original full vibration mode to the two-sided vibration mode, the vibration frequency of the ultrasonic oscillation unit 109** will change.

Figure 8:
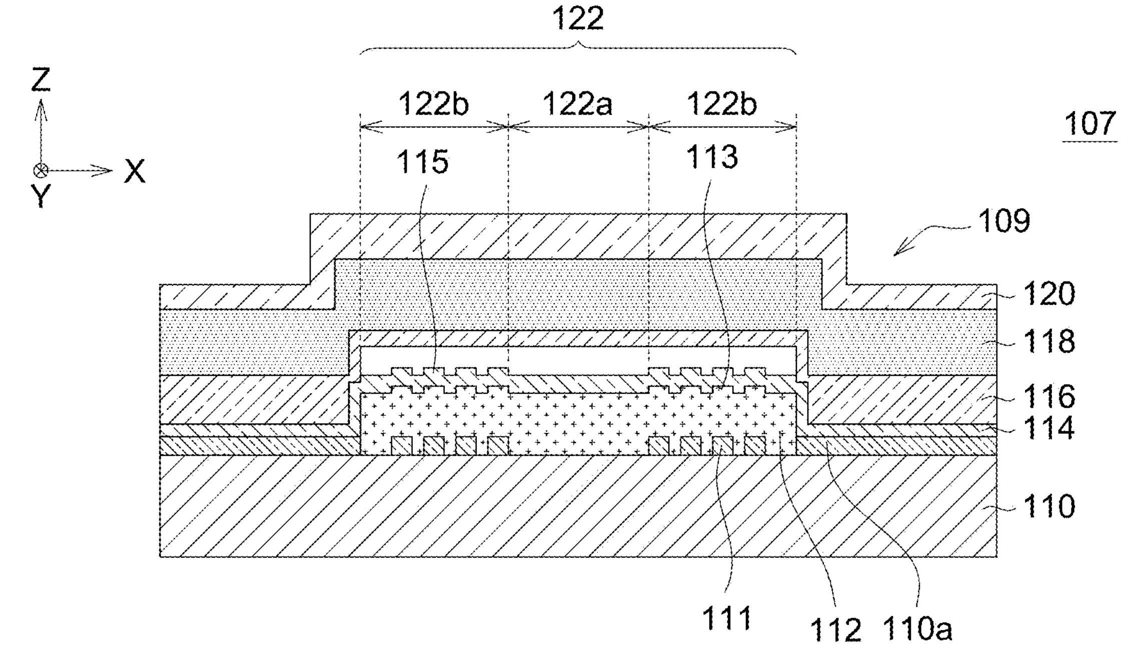
FIG. 8 is a cross-sectional view of an ultrasonic transducer device according to another embodiment of the invention.
Figure 9:
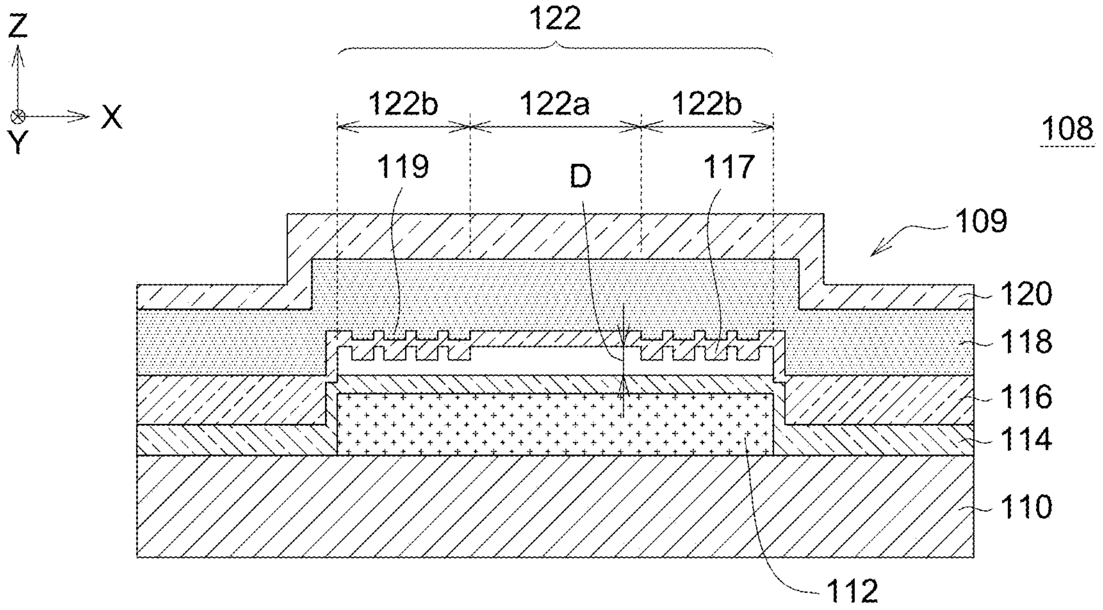
FIG. 9 is a cross-sectional view of an ultrasonic transducer device according to another embodiment of the invention.

Referring to FIGS. 8 and 9, cross sectional views of ultrasonic transducer devices 107 and 108 according to another embodiment of the invention are respectively shown. The present embodiment is different from the embodiments of FIG. 4 and FIG. 5 in that the cavity 122 has a first region **122*a* and a second region 122*b*; the first region 122*a* is located at the central part of the ultrasonic oscillation unit 109; the second region 122*b* surrounds the first region 122*a* and is located on the peripheral of the ultrasonic oscillation unit 109. The capacitor protrusions 115 and 117 are disposed in the second region 122*b* by being disposed on at least one of the first insulating layer 114 and the second insulating layer 116. Details of the disposition of the first electrode layer 112, the second electrode layer 118, the first insulating layer 114, the second insulating layer 116, a plurality of capacitor protrusions 115 and 117, and a plurality of electrode protrusions 113 and 119 can be obtained with reference to FIG. 4 and FIG. 5 and detailed descriptions are not repeated here. Detailed descriptions of changing the vibration frequency of the ultrasonic oscillation unit 109 by changing the vibration mode of the ultrasonic oscillation unit 109** from the original full vibration mode to the two-sided vibration mode are already disclosed above and are not repeated here.

Figure 10:
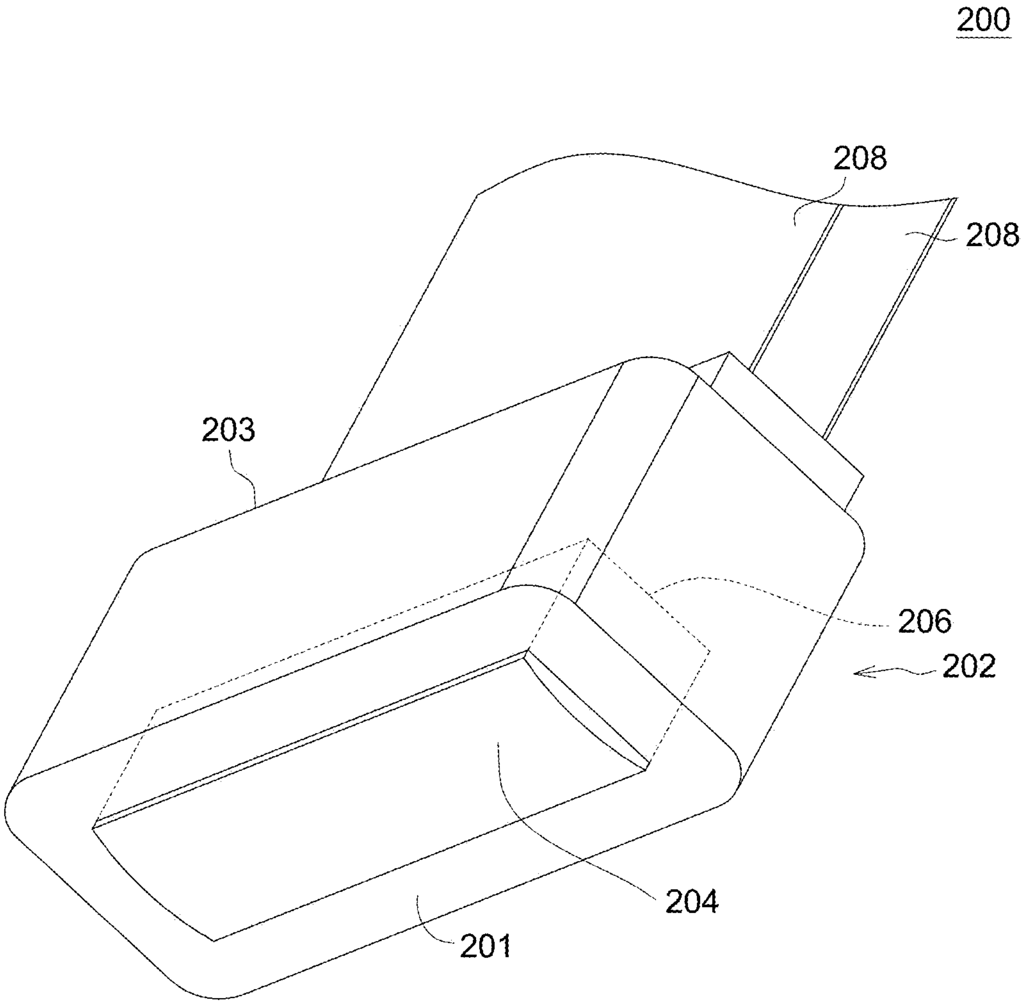
FIG. 10 is a schematic diagram of an ultrasonic probe according to an embodiment of the invention.

Referring to FIG. 10, a schematic diagram of an ultrasonic probe 200 according to an embodiment of the invention is shown. The ultrasonic probe 200 includes a hand-held casing 202, an acoustic lens 204, and an ultrasonic transducer device 206. The hand-held casing 202 has a first end (from end 201) and a second end (back end 203). The acoustic lens 204 is disposed at the first end or the second end. The ultrasonic transducer device 206 is disposed in the hand-held casing 202 and is located on one side of the hand-held casing 202 adjacent to the acoustic lens 202. In the present embodiment, when the user touches his/her skin using the ultrasonic probe 200, the ultrasonic probe 200 can focus the beams through the acoustic lens 204 at the front end 201 of the hand-held casing 202 to emit or receive ultrasonic signals, and the ultrasonic transducer device 206 can transmit acoustic signals to the ultrasonic device through the signal transmission line 208 to process the beams for ultrasonic imaging. Detailed descriptions of the ultrasonic transducer device 206 can be obtained with reference to the ultrasonic transducer devices 100-108 of the above embodiments and are not repeated here.

An ultrasonic transducer device and an ultrasonic probe using the same are provided in above embodiments of the invention. With a plurality of capacitor protrusions being formed above and/or below the cavity, the capacitor area and capacitance of the ultrasonic oscillation unit are increased, so that the sensitivity of the ultrasonic oscillation unit can be increased. Since the capacitor area and capacitance of the ultrasonic oscillation unit are positively related to the sensitivity of the ultrasonic oscillation unit, the increase in sensitivity improves the quality of signals and images as well as the efficiency of the ultrasonic oscillation unit.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An ultrasonic transducer device, comprising:

a substrate; and an ultrasonic oscillation unit disposed on the substrate, wherein the ultrasonic oscillation unit comprises a first electrode layer, a first insulating layer, a second electrode layer, a second insulating layer, a plurality of capacitor protrusions, and a cavity located between the first insulating layer and the second insulating layer; the capacitor protrusions are disposed in the cavity by being disposed on at least one of the first insulating layer and the second insulating layer; the first insulating layer and the second insulating layer are separated by a gap and are located between the first electrode layer and the second electrode layer, and a height of each of the capacitor protrusions is less than a height of the gap, wherein the capacitor protrusions comprise a plurality of first capacitor protrusions located on a first surface of the first insulating layer, a back surface of the first insulating layer is connected to the first electrode layer, and the first surface and the back surface are located on two opposite sides of the first insulating layer.

2. The ultrasonic transducer device according to claim 1, wherein the capacitor protrusions are arranged as a one-dimensional or two-dimensional array, and a distance between two adjacent capacitor protrusions of the capacitor protrusions is greater than or equivalent to 1.5 μm.

3. The ultrasonic transducer device according to claim 1, wherein the capacitor protrusions further comprise a plurality of second capacitor protrusions; the second capacitor protrusions are located on a second surface of the second insulating layer, and the first surface and the second surface are opposite to each other.

4. The ultrasonic transducer device according to claim 3, wherein the first capacitor protrusions and the second capacitor protrusions are arranged in a staggered manner.

5. The ultrasonic transducer device according to claim 1, wherein the first electrode layer comprises a plurality of electrode protrusions disposed corresponding to the first capacitor protrusions and protruded from or recessed towards a surface of the first electrode layer.

6. The ultrasonic transducer device according to claim 5, further comprising a third insulating layer disposed between the substrate and the first electrode layer, wherein the third insulating layer comprises a plurality of insulating protrusions disposed corresponding to the electrode protrusions.

7. The ultrasonic transducer device according to claim 3, wherein the second electrode layer comprises a plurality of electrode protrusions disposed corresponding to the second capacitor protrusions and protruded from or recessed towards a surface of the second electrode layer.

8. The ultrasonic transducer device according to claim 1, wherein at least one of the first electrode layer and the second electrode layer comprises a plurality of electrode protrusions disposed corresponding to the capacitor protrusions.

9. The ultrasonic transducer device according to claim 1, wherein the height of each of the capacitor protrusions is less than a half or a third of the height of the gap.

10. The ultrasonic transducer device according to claim 1, further comprising an upper insulating layer disposed on the second electrode layer.

11. The ultrasonic transducer device according to claim 1, wherein the cavity has a first region and a second region surrounding the first region; the capacitor protrusions are located in the second region.

12. The ultrasonic transducer device according to claim 11, wherein the first region, being a circular or polygonal space, has a transverse cross-sectional area greater than or equivalent to 10% of a transverse cross-sectional area of the cavity.

13. The ultrasonic transducer device according to claim 11, wherein the second electrode layer, relative to the first electrode layer, is driven by a direct current voltage to be recessed towards the first region, making the first insulating layer and the second insulating layer closer to each other.

14. The ultrasonic transducer device according to claim 13, wherein the second electrode layer, relative to the first electrode layer, is driven by an alternate current voltage or an external sound pressure to generate vibrations in the second region.

15. The ultrasonic transducer device according to claim 1, wherein the second electrode layer, relative to the first electrode layer, is driven by an alternate current voltage or an external sound pressure to generate vibrations.

16. An ultrasonic probe, comprising:

a hand-held casing having a first end and a second end;

an acoustic lens disposed on the first end or the second end; and an ultrasonic transducer device, disposed in the hand-held casing and located on one side of the hand-held casing adjacent to the acoustic lens, comprising:

a substrate; and an ultrasonic oscillation unit disposed on the substrate, wherein the ultrasonic oscillation unit comprises a first electrode layer, a first insulating layer, a second electrode layer, a second insulating layer, a plurality of capacitor protrusions, and a cavity located between the first insulating layer and the second insulating layer; the first insulating layer and the second insulating layer are located between the first electrode layer and the second electrode layer, the capacitor protrusions are disposed in the cavity by being disposed on at least one of the first insulating layer and the second insulating layer, and a height of each of the capacitor protrusions is less than a height of the cavity, wherein the cavity has a first region and a second region surrounding the first region, and the capacitor protrusions are located in the second region.

17. The ultrasonic probe according to claim 16, wherein the capacitor protrusions are located on a first surface of the first insulating layer, a second surface of the first insulating layer is connected to the first electrode layer, and the first surface and the second surface are located on two opposite sides of the first insulating layer; the first electrode layer comprises a plurality of electrode protrusions disposed corresponding to the capacitor protrusions and connected to the second surface.

* * * * *